(12) United States Patent
Artuso et al.

(10) Patent No.: US 10,663,326 B2
(45) Date of Patent: May 26, 2020

(54) RAYLEIGH SCATTERING BASED DISTRIBUTED FIBER SENSORS WITH OPTIMIZED SCATTERING COEFFICIENTS

(71) Applicant: Corning Incorporated, Corning, NY (US)

(72) Inventors: Anthony Artuso, Corning, NY (US); Valery A Kozlov, Acton, MA (US); Ming-Jun Li, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/047,582

(22) Filed: Jul. 27, 2018

(65) Prior Publication Data
US 2019/0056249 A1     Feb. 21, 2019

Related U.S. Application Data

(60) Provisional application No. 62/547,997, filed on Aug. 21, 2017.

(51) Int. Cl.
*G02B 6/10*     (2006.01)
*G01D 5/353*     (2006.01)
(Continued)

(52) U.S. Cl.
CPC ... *G01D 5/35361* (2013.01); *C03B 37/01433* (2013.01); *C03B 37/01838* (2013.01);
(Continued)

(58) Field of Classification Search
CPC ............... G02B 6/102; G02B 6/02042; G01D 5/35361; C03B 37/01838
See application file for complete search history.

(56) References Cited

U.S. PATENT DOCUMENTS 5,210,816 A * 5/1993 Iino ...................... C03B 37/0142
                                               385/123
6,400,878 B1 * 6/2002 Nagayama ............ C03B 37/029
                                               385/123
(Continued)

FOREIGN PATENT DOCUMENTS

RU         2532562 C1    11/2014

OTHER PUBLICATIONS

Likhachev et al; ""Mechanisms of Optical Losses in Fibres With a High Concentration of Germanium Dioxide"", Quantum Electronics, 33(7), 633-638, 2003.

*Primary Examiner* — Akm E Ullah
(74) *Attorney, Agent, or Firm* — Amy T. Lang; John P. McGroarty

(57) ABSTRACT

A fiber sensor includes an optical fiber configured for operation at a wavelength from about 800 nm to about 1600 nm. The optical fiber includes a cladding that is defined by a fiber outer diameter and a core that is surrounded by the cladding. The core of the optical fiber has a Rayleigh scattering coefficient, $\alpha_s$, that is controlled by controlling a concentration of one or more dopants in the core. The Rayleigh scattering coefficient is tuned to be within a predetermined range of an optimum Rayleigh scattering coefficient for a given total length, L, of the optical fiber. The predetermined range is from about 70% of the optimum $\alpha_s$ to about 130% of the optimum $\alpha_s$.

15 Claims, 7 Drawing Sheets

(51) Int. Cl.
*C03B 37/018* (2006.01)
*C03B 37/025* (2006.01)
*C03C 3/06* (2006.01)
*C03B 37/014* (2006.01)
*C03C 14/00* (2006.01)
*C03C 13/04* (2006.01)
*C03B 37/027* (2006.01)

(52) U.S. Cl.
CPC ............ *C03B 37/0253* (2013.01); *C03C 3/06* (2013.01); *C03C 13/045* (2013.01); *C03C 14/006* (2013.01); *G01D 5/3538* (2013.01); *G02B 6/102* (2013.01); *C03B 37/02718* (2013.01); *C03B 2201/31* (2013.01); *C03C 2201/02* (2013.01); *C03C 2201/31* (2013.01); *C03C 2201/40* (2013.01); *C03C 2214/16* (2013.01)

(56) References Cited

U.S. PATENT DOCUMENTS

| | | | | |
|---|---|---|---|---|
| 6,681,072 B2* | 1/2004 | Nagayama | ........ | C03B 37/01413 385/127 |
| 6,704,486 B2* | 3/2004 | Kamiya | ............ | G02B 6/02028 385/124 |
| 6,819,477 B2* | 11/2004 | Tsuzaki | .............. | H04B 10/2916 359/333 |
| 6,947,207 B2* | 9/2005 | Inoue | ...................... | H01S 3/302 359/334 |
| 7,190,868 B2* | 3/2007 | Yamamoto | ......... | H04B 10/2537 385/11 |
| 10,302,467 B2* | 5/2019 | Sternklar | ............ | G01M 11/3109 |
| 2002/0044753 A1* | 4/2002 | Nagayama | ............ | C03B 37/029 385/123 |
| 2006/0056785 A1* | 3/2006 | Sasaoka | .................. | C03C 13/04 385/123 |
| 2007/0258087 A1* | 11/2007 | Ogura | .................... | G01K 11/32 356/301 |
| 2009/0139270 A1 | 6/2009 | Filippov et al. | | |
| 2013/0287355 A1* | 10/2013 | Han | ..................... | G01N 21/554 385/128 |
| 2014/0204368 A1 | 7/2014 | Lewis et al. | | |
| 2014/0263985 A1 | 9/2014 | Westbrook | | |
| 2015/0076334 A1 | 3/2015 | Kragh et al. | | |
| 2015/0144333 A1 | 5/2015 | Lee et al. | | |
| 2016/0356709 A1* | 12/2016 | Kremp | ...................... | G02B 6/02 |

* cited by examiner

RAYLEIGH SCATTERING BASED DISTRIBUTED FIBER SENSORS WITH OPTIMIZED SCATTERING COEFFICIENTS

This application claims the benefit of priority under 35 U.S.C. § 119 of U.S. Provisional Application Ser. No. 62/547,997, filed on Aug. 21, 2017, the content of which is relied upon and incorporated herein by reference in its entirety.

FIELD

The present disclosure generally relates to fiber sensors and fiber sensor systems. More particularly, the disclosure relates to sensors and sensing systems that employ fibers that rely on Rayleigh scattering mechanisms for sensing.

BACKGROUND

Distributed fiber sensors and systems that rely on Rayleigh scattering are being adopted for many applications, including but not limited to, structure health monitoring (SHM), geotechnical engineering, power lines, oil and gas pipe lines, and oil and gas wells. In particular, these sensors and systems can employ Rayleigh scattering mechanisms to measure temperature, pressure, strain, acoustic waves and other parameters with a spatial resolution of less than 1 m.

Conventional approaches that rely on Rayleigh scattering often employ telecommunication grade optical fibers in distributed fiber sensors and systems to obtain these measurements (e.g., temperature, pressure, strain, etc.). Distributed fiber sensors and systems that rely on such optical fibers suffer from various drawbacks. For example, the optical power of the launched signal can be limited by low threshold, nonlinear effects in the fiber. As a result, the scattered signal is often low, especially at the far end of the fiber away from the transmission end. As another example, attenuation in these optical fibers can also limit the scattered signal strength at the far end of the fiber, especially for fiber spans of tens of kilometers. Further, the optical power in telecommunication grade fibers that are configured for single mode operation is often low due to the small numerical aperture of such fibers. All of these effects tend to reduce the signal-to-noise ratio associated with comparative distributed fiber sensors and systems that employ telecommunication grade optical fibers.

As distributed fiber sensors and systems that rely on optical fibers and Rayleigh scattering mechanisms continue to be employed in various applications (e.g., geotechnical engineering, power lines, etc.), the use of these sensors and systems is generally limited by their effectiveness at longer distances.

There is therefore a need for distributed fiber sensors and fiber sensor systems that employ optical fibers that can transmit optical signals with less signal loss and higher signal-to-noise ratios. More particularly, there is a need for enhanced distributed fiber sensors and sensor systems that employ fibers that rely on Rayleigh scattering mechanisms and are designed and controlled for predetermined distances.

SUMMARY

According to one embodiment, a fiber sensor includes an optical fiber configured for operation at a wavelength from about 800 nm to about 1600 nm. The optical fiber includes a cladding that is defined by a fiber outer diameter and a core that is surrounded by the cladding. The core of the optical fiber has a Rayleigh scattering coefficient, $\alpha_s$, that is controlled by controlling a concentration of one or more dopants in the core. The Rayleigh scattering coefficient is tuned to be within a predetermined range of an optimum Rayleigh scattering coefficient for a given total length, L, of the optical fiber. The predetermined range is from about 70% of the optimum $\alpha_s$ to about 130% of the optimum $\alpha_s$.

According to another embodiment, a fiber sensor includes an optical fiber configured for operation at a wavelength from about 800 nm to about 1600 nm. The optical fiber includes a cladding that is defined by a fiber outer diameter and a core that is surrounded by the cladding. The core of the optical fiber is doped with $GeO_2$ to a dopant level of at least about 20%.

According to yet another embodiment, a fiber sensor includes an optical fiber configured for operation at a wavelength from about 800 nm to about 1600 nm. The optical fiber includes a cladding that is defined by a fiber outer diameter and a core that is surrounded by the cladding. The core of the optical fiber has a Rayleigh scattering coefficient, $\alpha_s$, that is given by:

$$\alpha_s = \frac{4.3}{2L},$$

where L is a total length of the optical fiber. The Rayleigh scattering coefficient of the optical fiber is controlled by controlling a first dopant comprising $GeO_2$ concentration in the core.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Figure 1:
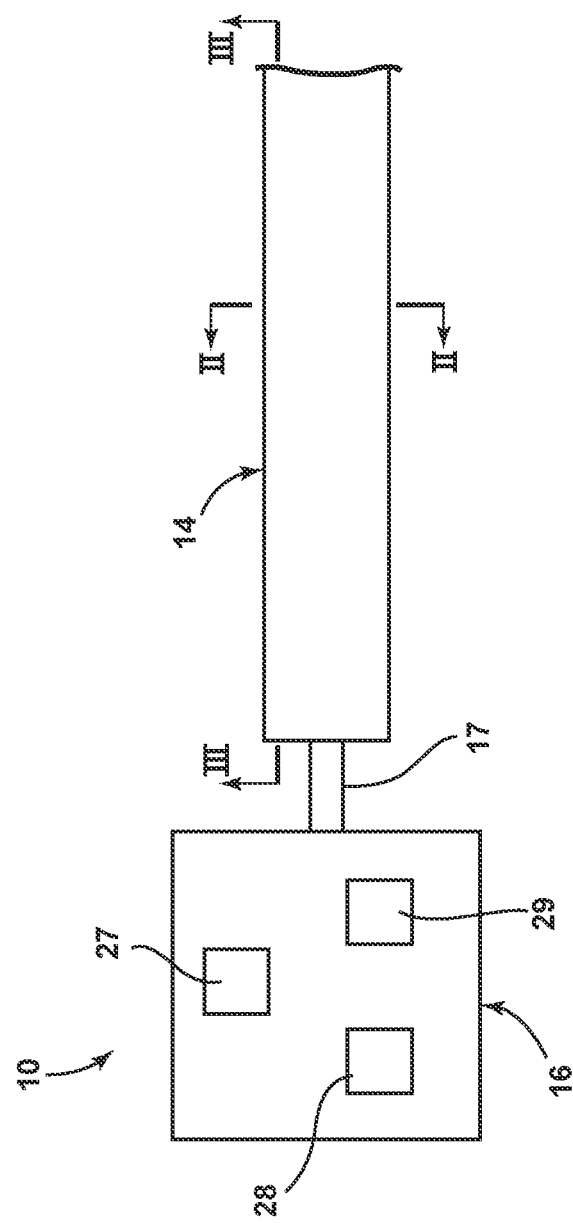
FIG. 1 schematically illustrates a fiber sensor having an optical fiber and a control system.

Reference will now be made in detail to the present preferred embodiments, examples of which are illustrated in the accompanying drawings. Whenever possible, the same reference numerals will be used throughout the drawings to refer to the same or like parts.

An "up-dopant" is herein considered to be a dopant which has a propensity to raise the refractive index relative to pure undoped silica. A "down-dopant" is herein considered to be a dopant which has a propensity to lower the refractive index relative to pure undoped silica. Examples of up-dopants include $GeO_2$, $Al_2O_3$, $P_2O_5$, $TiO_2$, Cl, and Br. Further, the terms "germania," "Ge" and "$GeO_2$" are used interchangeably herein and refer to $GeO_2$. Examples of down-dopants include F and B. Further, the terms "fluorine" and "F" are used interchangeably to denote a fluorine dopant originating from a fluorine dopant precursor including, but not limited to, $CF_4$, $SiF_4$ and $C_2F_6$.

Distributed fiber sensors and fiber sensor systems that employ optical fibers capable of transmitting optical signals with less signal loss and higher signal-to-noise ratios are outlined in exemplary fashion in the present disclosure. More particularly, this disclosure details distributed fiber sensors and sensor systems that employ fibers that rely on Rayleigh scattering mechanisms and are designed and controlled for predetermined sensing distances.

Figure 2:
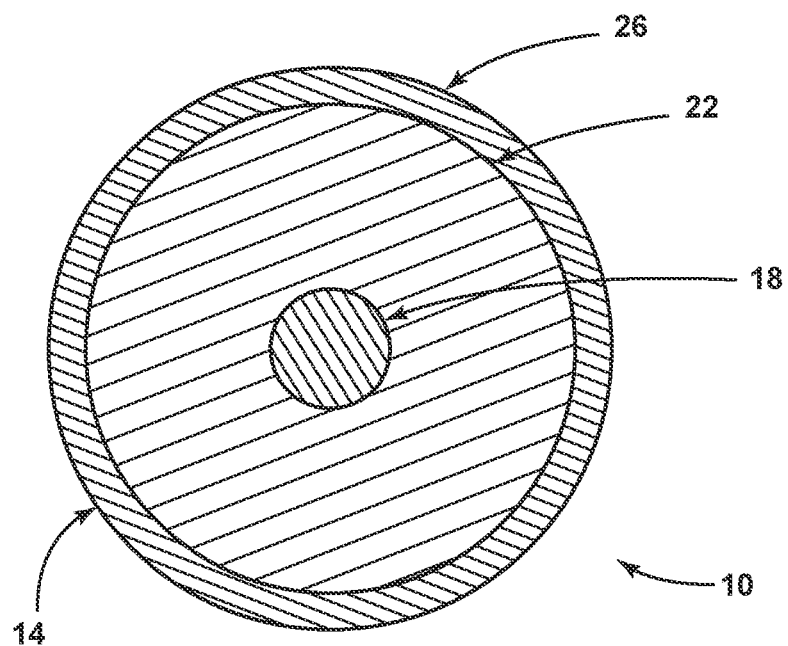
FIG. 2 schematically illustrates a cross-sectional view of the fiber sensor taken along line II-II of FIG. 1.

As depicted in FIGS. 1 and 2, a fiber sensor 10 includes an optical fiber 14 and a control system 16. The optical fiber 14 and the control system 16 may be operably coupled by a light transmitting member 17. The optical fiber 14 includes a core 18 and a cladding layer (or cladding) 22 surrounding and directly adjacent (i.e. in contact with) the core 20. In some embodiments, the cladding 22 is surrounded by one or more coatings 26, for example by an acrylate polymer. The control system 16 may include a light source 27, a light detector 28, and a processor 29.

Figure 3:
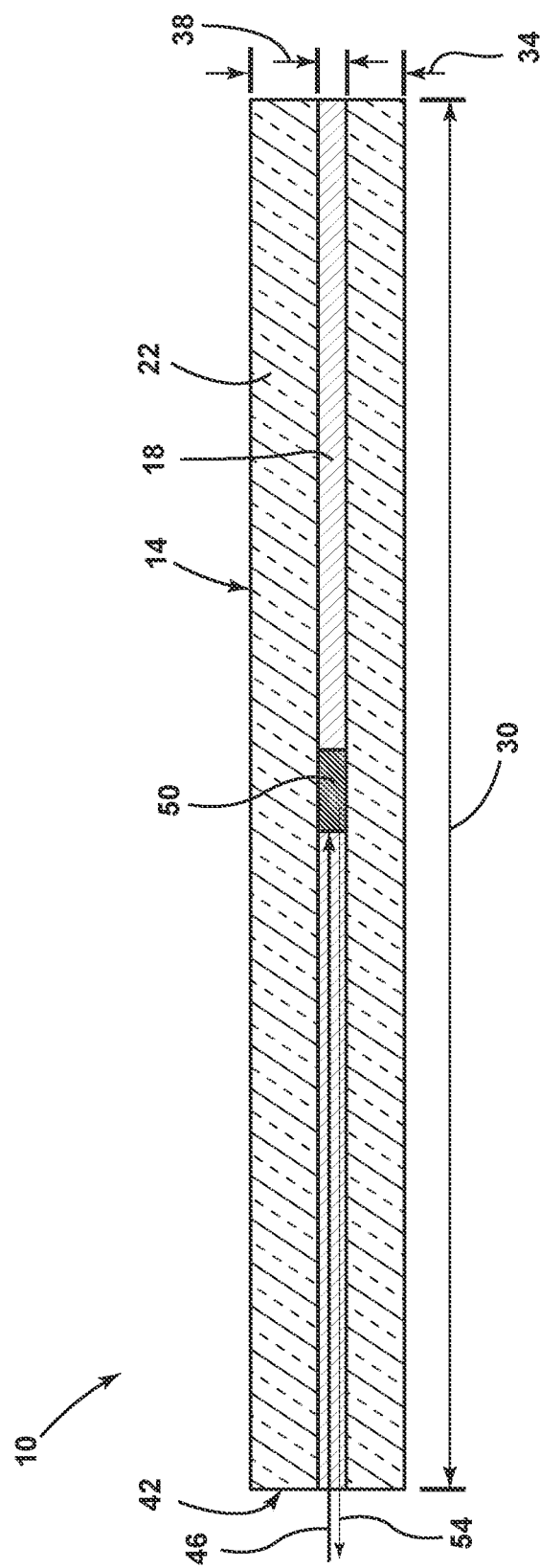
FIG. 3 schematically illustrates a cross-sectional view of the fiber sensor taken along line of FIG. 1.

Referring to FIG. 3, the fiber sensor 10 is depicted according to an aspect of the disclosure. The fiber sensor 10 includes the optical fiber 14 defined by the core 18, the cladding 22, a length 30, an outer diameter 34, and a core diameter 38. As shown, a first end 42 of the optical fiber 14 receives light from the light source 27 (FIG. 1) at a launch power 46. The light source may be a pulsed light source, such as a pulsed laser. The light from the light source travels along the optical fiber 14 to an intermediate location 50 along the optical fiber 14. Once the light from the light source reaches the intermediate location 50, the light is scattered as a result of scattering mechanisms, such as Rayleigh scattering. A fraction of the light that is scattered at the intermediate location 50 returns to the first end 42 at a power that is less than the launch power 46. The light that returns to the first end 42 is commonly referred to as backscatter. The power of the backscattered light may be referred to as the observed power 54. However, some of the backscattered light does not reach the first end 42 due to various causes. These causes include, but are not limited to, attenuation due to additional scattering between the intermediate location 50 and the first end 42, lacking a sufficient angle to be properly guided along the optical fiber 14 from the intermediate location 50 to the first end 42, etc. The backscattered light may be caused by changes in the environment around the fiber sensor 10. The changes in the environment around the fiber sensor may be phenomena that a user desires to monitor or measure. For example, the phenomena may be seismic activity, changes in temperature, changes in strain on the fiber sensor 10, impact of acoustic waves, changes in pressure, etc.

In a Rayleigh scattering based distributed sensing system, such as that shown in FIG. 2, the power detected from Rayleigh scattering, $P_s$, at location, z, may be given by Equation (1):

$$P_s = C\alpha_s \Delta l P_0 e^{-2(\alpha_s + \alpha_0)z} \quad (1)$$

where $P_s$ is the power detected from Rayleigh scattering (e.g., the observed power 54), z is a location along the optical fiber 14 (e.g., the intermediate location 50), $P_0$ is the launch power 46 into the optical fiber 14 at the first end 42 where the location is z=0, $\alpha_s$ is the Rayleigh scattering coefficient, $\alpha_0$ is the loss coefficient due to factors other than Rayleigh scattering, and $\Delta l$ is the pulse sensing segment that is related to the pulse width from the light source.

The capture efficiency of an optical fiber, C, may be given by Equation (2a):

$$C = \kappa \frac{NA^2}{n_1^2} \quad (2a)$$

where NA is the numerical aperture of the core, $n_1$ is the refractive index of the core, $\kappa$ is a parameter that is dependent upon the type of core utilized in the fiber. For a multimode fiber with a step refractive index profile $\kappa$ is typically about 0.38. For a multimode fiber with a graded refractive index profile $\kappa$ is typically about 0.25. For a single mode optical fiber, the capture efficiency, C, may be rewritten as shown in Equation (2b):

$$C = \frac{3v_g}{k_0^2 n_{eff}^2 D_{MF}^2} \quad (2b)$$

where $v_g$ is the group velocity, $n_{eff}$ is the effective index, $k_0$ is the wavenumber, and $D_{MF}$ is the mode field diameter.

According to some embodiments, the condition under which the maximum Rayleigh scattering power is detected can be derived from Equation (1) and is given by Equation (3):

$$\alpha_s = \frac{4.3}{2L} \quad (3)$$

where L is the total length of the fiber and $\alpha_s$ has units of dB/km.

Figure 4:
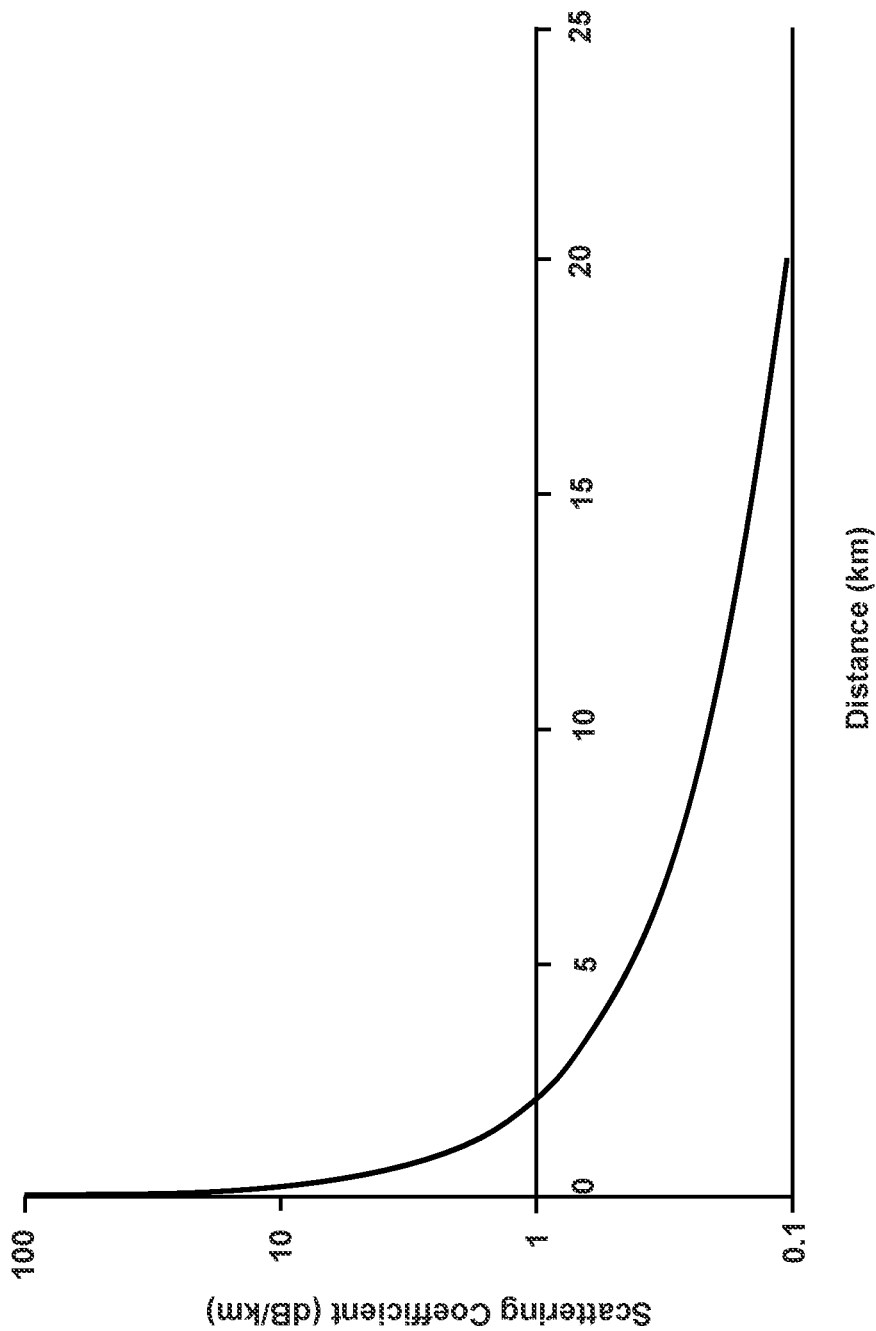
FIG. 4 is a graph illustrating a scattering coefficient versus distance plot that depicts an optimum Rayleigh scattering coefficient for a given sensing distance.

Referring now to FIG. 4, Equation (3) is shown in graphical form. Equation (3) shows that the optimum Rayleigh scattering coefficient depends on the sensing distance of the fiber sensor. For fiber sensors that sense at shorter distances (e.g., less than 0.5 km), a larger Rayleigh scattering coefficient is beneficial. Production of fiber sensors that have larger Rayleigh scattering coefficients is less expensive than production of fiber sensors that have smaller Rayleigh scattering coefficients. Accordingly, employing sensing systems that utilize fiber sensors with larger Rayleigh scattering coefficients decreases the overall cost of the sensing system by decreasing the cost of at least some of the components. Conversely, low Rayleigh scattering coefficients enable sensing with fiber sensors at longer distances (e.g., greater than 1 km, greater than 5 km, etc.).

Table 1 below shows examples of Rayleigh scattering coefficients that provide an optimum backscatter power for various fiber sensor sensing lengths. Table 1 further includes ranges of sensing distances for 90% and 80% of the optimum backscattered power levels. As optimum backscatter values may not be necessary in some applications, the ranges of sensing distances that correspond to 90% and 80% of the optimum backscattered power levels may be used to aid in the selection of an appropriate Rayleigh scattering coefficient for a given application. While specific examples are set forth in Table 1 below, the present disclosure is not so limited.

TABLE 1

| Rayleigh Scattering Coefficient (dB/km) | Fiber Core Properties | | | Optimum Power Sensing Distance (km) | 90% of Optimum Power Sensing Distance (km) | 80% of Optimum Power Sensing Distance (km) |
|---|---|---|---|---|---|---|
| | Dopant | Nanoparticle Diameter | Dopant Concentration | | | |
| 4.3 | $ZrO_2$ | 200 nm | 1350/mm$^3$ | 0.5 | 0.32-0.82 | 0.27-1.05 |
| 2.15 | $ZrO_2$ | 175 nm | 1490/mm$^3$ | 1 | 0.64-1.63 | 0.54-2.1 |
| 1.075 | $ZrO_2$ | 150 nm | 1880/mm$^3$ | 2 | 1.3-3.25 | 1.09-4.21 |
| 0.43 | $ZrO_2$ | 100 nm | 850/mm$^3$ | 5 | 3.2-8.2 | 2.7-10.5 |
| 0.35 | $GeO_2$ | N/A | 62.7% (w/w) | 6 | 3.9-9.7 | 3.3-12.6 |
| 0.215 | $GeO_2$ | N/A | 24% (w/w) | 10 | 6.4-16.3 | 5.4-21 |
| 0.143 | Pure Silica | N/A | N/A | 15 | 9.7-24.4 | 8.1-31.5 |
| 0.1075 | Pure Silica | N/A | N/A | 20 | 12.9-32.6 | 10.8-42 |

The Rayleigh scattering coefficient of the optical fiber can be altered by various methods. These methods include, but are not limited to, changing the dopant used, changing the concentration of the dopant used, altering processing conditions for the optical fiber, utilizing more than one dopant (e.g., co-doping), increasing the cooling rate of the optical fiber during the drawing of the optical fiber in the manufacturing process, and combinations thereof. Suitable dopants include, but are not limited to, germanium, fluorine, aluminum, tantalum, and nanoparticles. For germanium-doped optical fibers, increasing the concentration of germanium in the core increases the Rayleigh scattering coefficient. For optical fibers with high Rayleigh scattering coefficients, the germanium concentration is preferably greater than about 20%. For optical fibers with high Rayleigh scattering coefficients, the germanium concentration is more preferably greater than about 30%. For optical fibers with high Rayleigh scattering coefficients, the germanium concentration is most preferably greater than about 40%.

The type of dopant used may dictate at what point in the manufacturing process the dopant is added. For example, oxidizable dopants, such as germanium, are typically added to the process during the deposition of the soot layer. More specifically, in an outside vapor deposition (OVD) process, the dopant gas and oxygen may be flowed to a natural gas burner or hydrogen-oxygen burner. As the dopant gas flows through the burner the dopant gas reacts with oxygen under the heat of the burner by forming solid particles that are commonly referred to as "soot." The soot may be alternatively referred to as a low-density glass. The soot is deposited onto a ceramic target to form a soot preform. The soot preform is dried with $Cl_2$ gas at an elevated temperature (e.g., 1100° C.) in a consolidation furnace to remove water from the soot. Once dried, the soot preform is consolidated into transparent glass at a consolidation temperature (e.g., 1450° C.) while exposed to a Helium atmosphere. Non-oxidizable dopants, such as chlorine and fluorine, may be added during the consolidation step. More specifically, the non-oxidizable dopant may be flowed into the preform as a gas and as the soot is exposed to the heat provided by the furnace in the consolidation step the non-oxidizable dopant reacts with the soot and is incorporated into the glass structure formed by the consolidation of the soot.

Dopants may be incorporated into the soot preform using processes other than the OVD process discussed above. For example, dopants may be incorporated into the preform by vapor axial deposition (VAD), modified chemical vapor deposition (MCVD), or plasma chemical vapor deposition (PCVD). In embodiments that utilize nanoparticles, the nanoparticles may be incorporated using a solution doping process. In the solution doping process, a soot preform is prepared, for example by the OVD process. Then the soot preform is submerged in a solution that contains the nanoparticles and the nanoparticles diffuse into the preform. Once the nanoparticles have diffused into the soot preform, the soot preform is dried and consolidated into a glass preform. An alternative approach to the solution doping process for incorporation of the nanoparticles into the soot preform is to utilize a soot pressing process. In the soot pressing process soot powders are mixed uniformly with nanoparticles. Then, the soot and nanoparticle mixture is placed into a cylindrical mod and pressed together under pressure to form a soot preform that is doped with nanoparticles. Next, the soot preform is dried and consolidated into a glass preform. Once the preform is completed, regardless of the process used to achieve the preform, the preform can be drawn into a fiber using a fiber drawing tower. As the fiber is drawn on the drawing tower, the Rayleigh scattering coefficient can be controlled further by altering the cooling rate during the fiber drawing process. The cooling rate can be used to further control the Rayleigh scattering coefficient because the Rayleigh scattering coefficient is proportional to the fictive temperature at which the glass structure is frozen or set during the drawing process. For example, a rapid cooling rate increases the fictive temperature and results in a proportional increase in the Rayleigh scattering coefficient.

Figure 5:
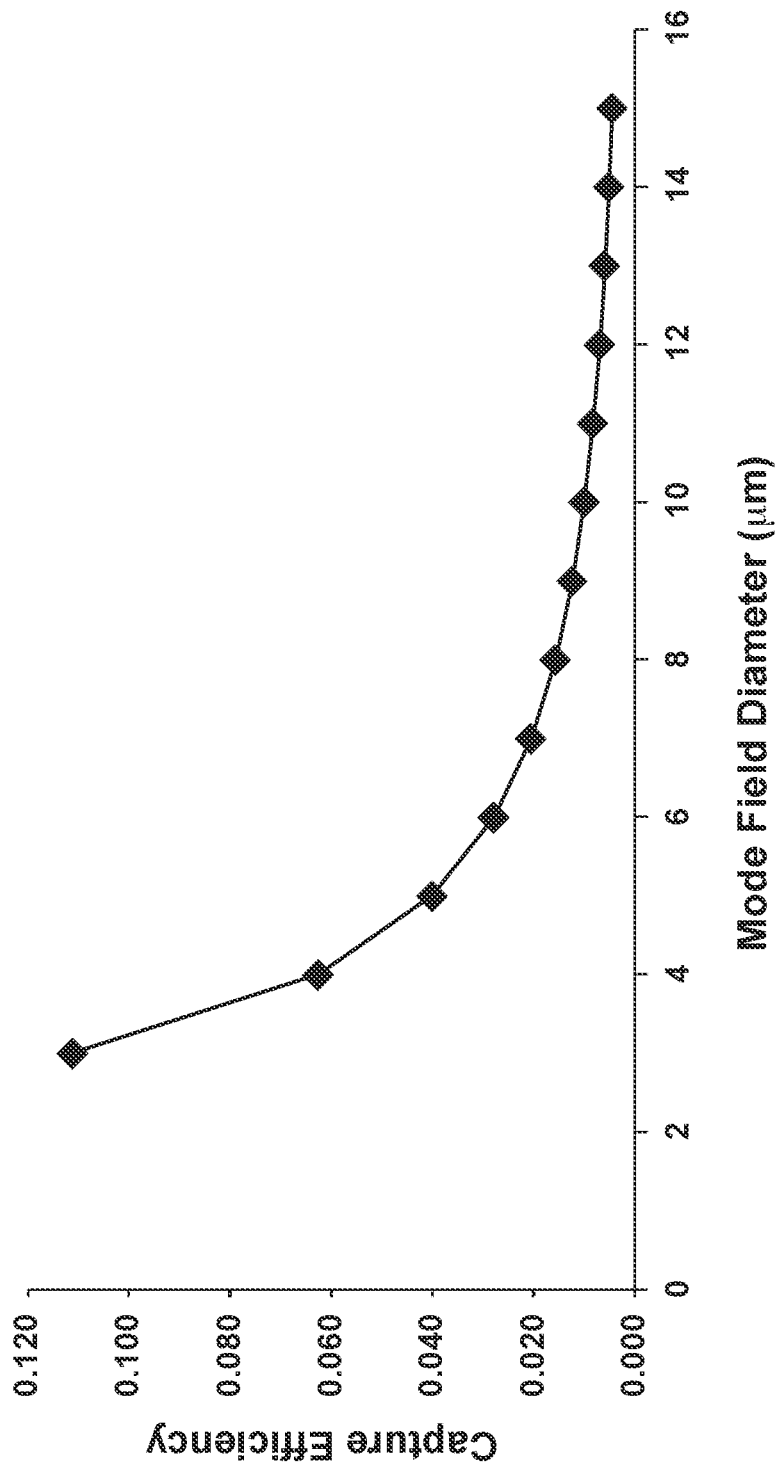
FIG. 5 is a graph illustrating a capture efficiency versus mode field diameter plot.

Referring to FIG. 5, a graph is shown illustrating capture efficiency versus mode field diameter. The capture efficiency of the optical fiber is an additional parameter that may be controlled for a particular fiber sensor length. For single mode fibers, the capture efficiency depends on an operating wavelength of the fiber sensor and several other fiber parameters, such as the mode field diameter as shown in Equation (2b). The capture efficiency for multimode fibers can be calculated using the numerical aperture, NA, as shown in Equation (2a). For embodiments that employ a step index profile, κ is about 0.38. For embodiments that employ a graded index profile, κ is about 0.25. The refractive index profile of the optical fiber is strongly dependent upon the mode field diameter of the optical fiber. For example, as shown in FIG. 5, reducing the mode field diameter from 10 µm to 6 µm results in a three-fold increase in the capture efficiency for the fiber sensor from a capture efficiency of about 0.010 to a capture efficiency of about 0.030. The attenuation of the Rayleigh backscattered signal detected (e.g., the observed power) is dependent to a large extent on the values of the Rayleigh scattering coefficient, $\alpha_s$, and the loss coefficient due to factors other than Rayleigh scattering, $\alpha_0$.

Figure 6:
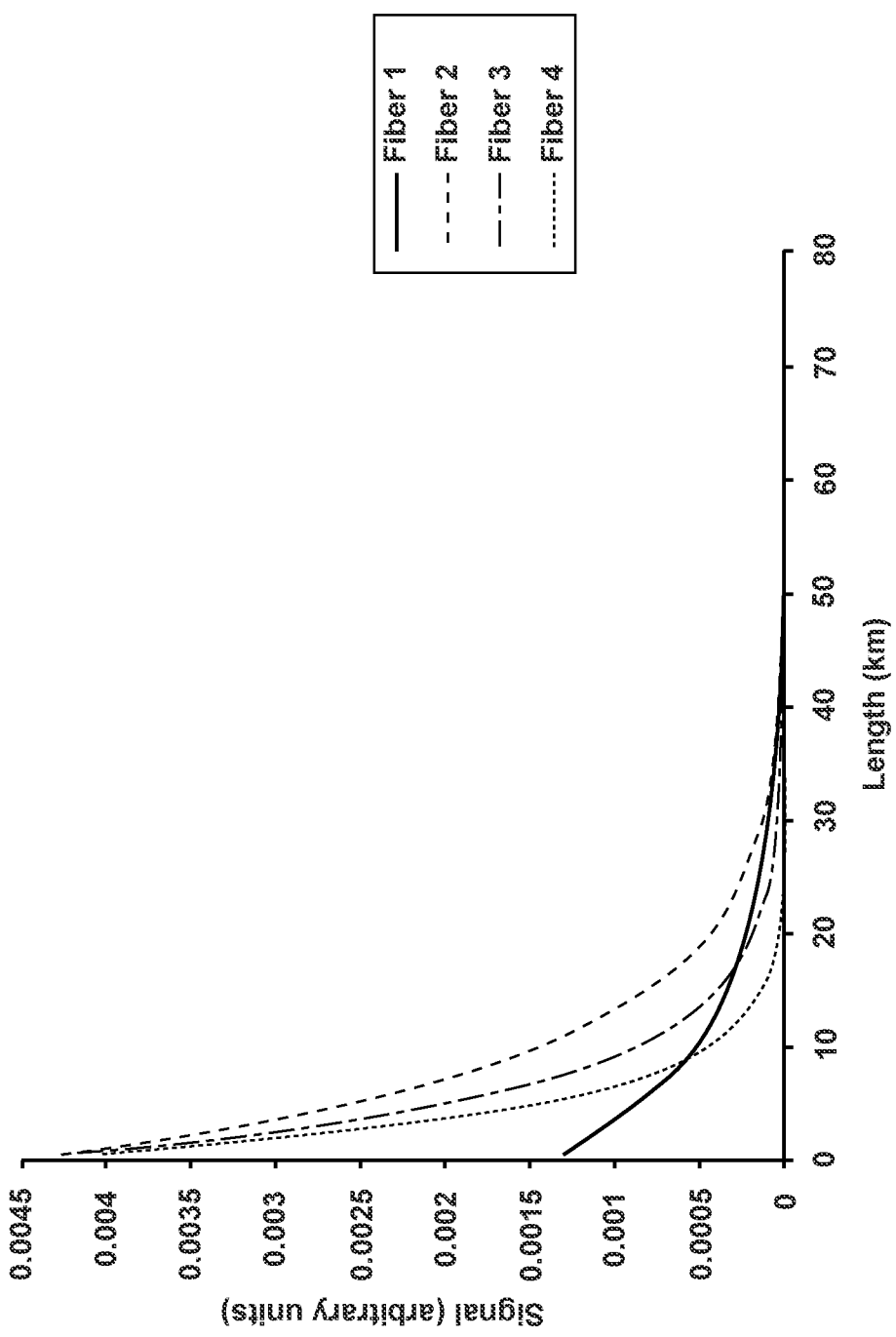
FIG. 6 is a graph illustrating Rayleigh backscattered signal versus length for several optical fibers.

Referring now to FIG. 6, Rayleigh backscattered signals, such as the observed power, for several fibers are shown. Fiber 1 has a Rayleigh scattering coefficient, $\alpha_s$, and a loss coefficient, $\alpha_0$, that are similar to those of a standard single mode fiber, where $\alpha_s$ is about 0.163 dB/km and $\alpha_0$ is about 0.03 dB/km. The mode field diameter of Fiber 1 is about 10.4 µm at 1550 nm. Fibers 2-4 represent optical fibers with similar Rayleigh scattering coefficients of about 0.2 dB/km, which is higher than that of Fiber 1. Fibers 2-4 have varying levels of attenuation within the optical fibers due to the non-Rayleigh scattering loss coefficient $\alpha_0$. The value of $\alpha_0$ for Fiber 2 is about 0.05 dB/km. The value of $\alpha_0$ for Fiber 3 is about 0.15 dB/km. The value of $\alpha_0$ for Fiber 4 is about 0.3 dB/km. In other words, the value of $\alpha_0$ for Fiber 2 is less than the value of $\alpha_0$ for Fiber 3 and the value of $\alpha_0$ for Fiber 3 is less than the value of $\alpha_0$ for Fiber 4. The mode field diameter for Fibers 2-3 is about 6.5 µm at 1550 nm, which is less than the mode field diameter of Fiber 1.

As described in Equations 1-2b, the observed power is proportional to the Rayleigh scattering coefficient and the capture efficiency, C. The capture efficiency is inversely proportional to the square of the mode field diameter. As shown in FIG. 6, the maximum backscattered power at the first end of the fiber for Fibers 2-4 is about 3.2 times higher than that of Fiber 1. As further shown in FIG. 6, as the non-Rayleigh scattering loss coefficient increases the observed power or signal decreases more rapidly as the length of the optical fiber increases. In other words, for fiber lengths of less than about 8 km, Fibers 2-4 have stronger backscatter signals than Fiber 1. For fiber lengths that are less than about 17 km, Fibers 2 and 3 have stronger backscattered signals than Fiber 1 and Fiber 4. For Fiber lengths that are less than about 35 km, Fiber 2 has the strongest backscattered signal and Fibers 1, 3, and 4 are not suitable for this distance. Accordingly, there is a need for fiber sensors and optical fibers that have well controlled Rayleigh scattering coefficients and non-Rayleigh scattering loss coefficients. Moreover, there is a need for fiber sensors and optical fibers that are controlled and/or tuned to be operated in specific length ranges. By providing fiber sensors and optical fibers that are controlled and/or tuned to be operated in specific length ranges, such as those shown in Table 1, it is possible to provide fiber sensors and optical fibers that include greater precision in the observed power or signal detected by the fibers.

Figure 7:
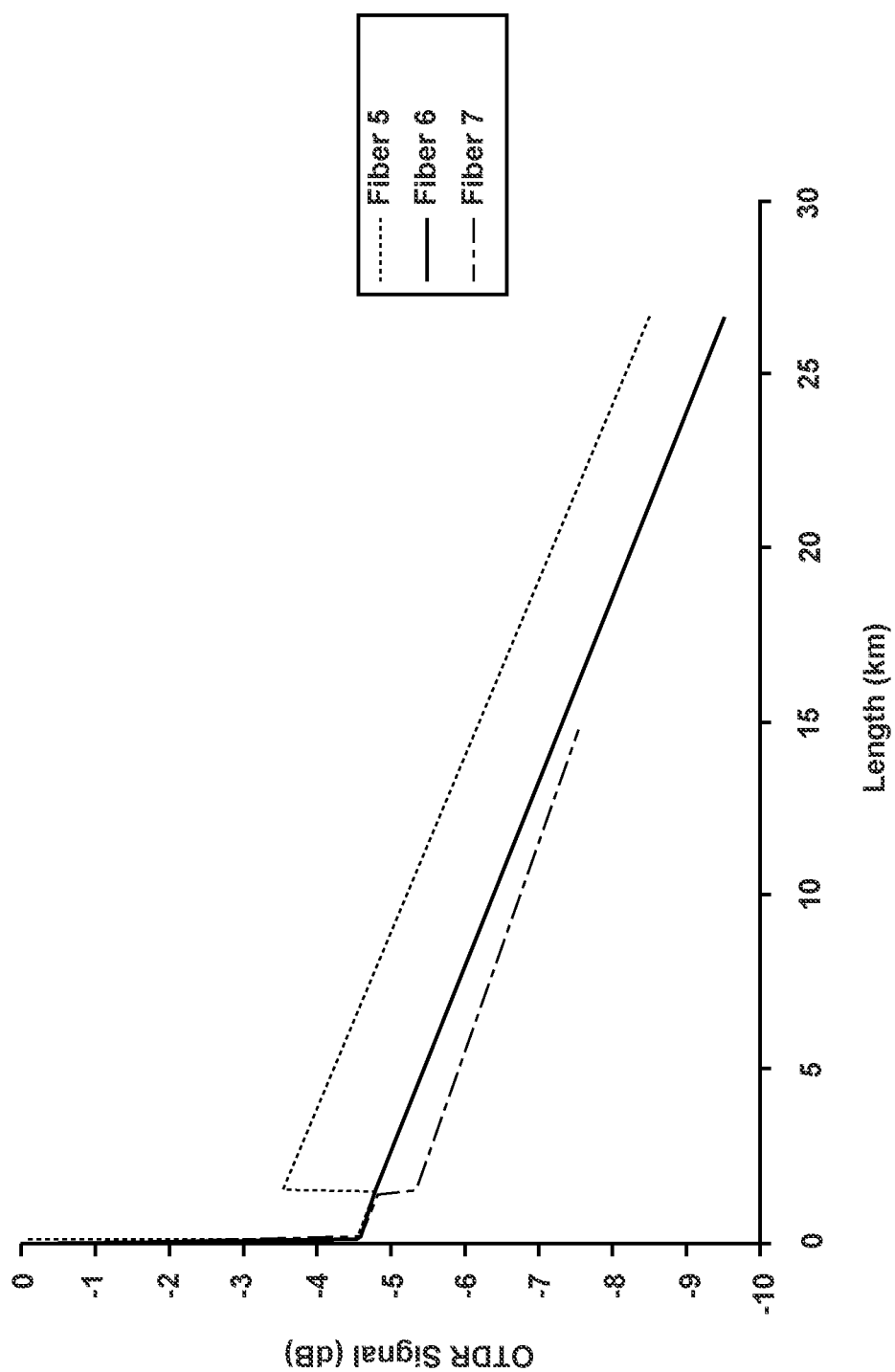
FIG. 7 is a graph illustrating an Optical Time Domain Reflectometer signal versus length plot for various optical fibers.

Referring to FIG. 7, three exemplary fibers are shown, Fibers 5-7, where the Optical Time Domain Reflectometer (OTDR) signal was measured for various sensing lengths of the optical fibers, thereby producing OTDR traces for Fibers 5-7. The OTDR signal was measured at 1550 nm. Fiber 5 has a Rayleigh scattering coefficient, $\alpha_s$, of about 0.175 dB/km and a loss coefficient, $\alpha_0$, of about 0.03 dB/km. Fiber 6 has a Rayleigh scattering coefficient of about 0.165 dB/km and a loss coefficient of about 0.03 dB/km. Fiber 7 has a Rayleigh scattering coefficient of about 0.153 dB/km and a loss coefficient of about 0.03 dB/km. The mode field diameters of Fibers 5-7 at 1550 nm are 8.1 µm, 10.4 µm, and 10.4 µm, respectively.

The signal level of the OTDR traces is directly proportional to the Rayleigh scattering coefficient and inversely proportional to the square of the mode field diameter for the associated optical fiber. The slope of the OTDR traces is proportional to the total attenuation coefficient of the associated fiber. Fiber 5 has the smallest mode field diameter and highest Rayleigh scattering coefficient of Fibers 5-7. The OTDR trace of Fiber 5 shows the greatest Rayleigh backscattered signal level of Fibers 5-7. Fiber 6 has a larger mode field diameter and lower Rayleigh scattering coefficient compared with Fiber 5. Fiber 6 has a corresponding intermediate OTDR trace with a backscattered signal level lower than that of Fiber 5. Fiber 7 has the same mode field diameter as Fiber 6 and the lowest Rayleigh scattering coefficient of Fibers 5-7. The OTDR trace of Fiber 7 has the lowest backscattered signal level. The slope of the OTDR trace corresponds to the total attenuation of the associated fiber. In FIG. 7, the slope of Fiber 5 is the greatest, the slope of Fiber 6 is less than that of Fiber 5, and the slope of Fiber 7 is the lowest. The total attenuation of Fiber 5-7 is 0.205 dB/km, 0.195 dB/km, and 0.183 dB/km, respectively. The OTDR trace that is measured for a given optical fiber may be used to calculate the Rayleigh scattering coefficient and the total attenuation coefficient for the optical fiber. The OTDR traces measured for a given optical fiber may be further used to inform the choice of an optical fiber for a given desired sensing distance for the fiber sensor.

In embodiments of the foregoing aspects, the optical fiber may be a single mode fiber or a multimode fiber. The optical fiber may be configured for operation at or around wavelengths within a range from about 800 nm to about 1600 nm. It is contemplated that the optical fiber may be configured for operation at a wavelength or range of wavelengths that corresponds to a desired light source. For example, the optical fiber may be configured for operation at any wavelength that falls within the range of about 800 nm to about 1600 nm. The optical fiber may be configured for operation at any range of wavelengths that falls within the range of about 800 nm to about 1600 nm. For example, the optical fiber may be configured for operation in a wavelength range that is from about 825 nm to about 875 nm. The optical fiber may be configured for operation in a wavelength range that is from about 980 nm to about 1060 nm. The optical fiber may be configured for operation in a wavelength range that is from about 1275 nm to about 1325 nm. The optical fiber may be configured for operation in a wavelength range that is from about 1525 nm to about 1575 nm. The optical fiber may be configured for operation at a combination of wavelength ranges and/or wavelengths that fall within the range of about 800 nm to about 1600 nm.

In some embodiments of the foregoing aspects, the core of the optical fiber has a Rayleigh scattering coefficient, $\alpha_s$, that is tuned to be within a predetermined range of an optimum $\alpha_s$ value. The optimum $\alpha_s$ value is tuned for a given total length, L, of the optical fiber. The predetermined range of the optimum $\alpha_s$ value may be from about 70% of the optimum $\alpha_s$ value to about 130% of the optimum $\alpha_s$ value. The predetermined range of the optimum $\alpha_s$ value may be from about 75% of the optimum $\alpha_s$ value to about 125% of the optimum $\alpha_s$ value. The predetermined range of the optimum $\alpha_s$ value may be from about 80% of the optimum $\alpha_s$ value to about 120% of the optimum $\alpha_s$ value. The predetermined range of the optimum $\alpha_s$ value may be from about 85% of the optimum $\alpha_s$ value to about 115% of the optimum $\alpha_s$ value. The predetermined range of the optimum $\alpha_s$ value may be from about 90% of the optimum $\alpha_s$ value to about 110% of the optimum $\alpha_s$ value. The predetermined range of the optimum $\alpha_s$ value may be from about 95% of the optimum $\alpha_s$ value to about 105% of the optimum $\alpha_s$ value.

In embodiments of the foregoing aspects, the optical fiber may be doped with a first dopant. The first dopant may be $GeO_2$. The concentration of the first dopant may be at least about 10%. The concentration of the first dopant may be at least about 20%. The concentration of the first dopant may be at least about 30%. The concentration of the first dopant may be at least about 40%. The concentration of the first dopant may be at least about 50%. The concentration of the first dopant may be at least about 60%. The concentration of the first dopant may be at least about 70%. The concentration of the first dopant may be at least about 80%.

The optical fibers may be additionally or alternatively doped with a second dopant. The second dopant may be nanoparticles for increasing the Rayleigh scattering coefficient. The optical fibers may be doped with nanoparticles in the silica core and a low index dopant in the cladding. The nanoparticles may have a diameter of less than 300 nm. The nanoparticles may have a diameter of less than 275 nm. The nanoparticles may have a diameter of less than 250 nm. The nanoparticles may have a diameter of less than 225 nm. The nanoparticles may have a diameter of less than 200 nm. The nanoparticles may have a diameter of less than 175 nm. The nanoparticles may have a diameter of less than 150 nm. The nanoparticles may have a diameter of less than 125 nm. The nanoparticles may have a diameter of less than 100 nm. The nanoparticles may have a diameter of less than 75 nm. The nanoparticles may have a diameter of less than 50 nm. The nanoparticles may have a diameter of less than 25 nm. The concentration of nanoparticles may be at least about 800/$mm^3$. The concentration of nanoparticles may be at least about 850/$mm^3$. The concentration of nanoparticles may be at least about 900/$mm^3$. The concentration of nanoparticles may be at least about 950/$mm^3$. The concentration of nanoparticles may be at least about 1000/$mm^3$. The concentration of nanoparticles may be at least about 1050/$mm^3$. The concentration of nanoparticles may be at least about 1100/$mm^3$. The concentration of nanoparticles may be at least about 1150/$mm^3$. The concentration of nanoparticles may be at least about 1200/$mm^3$. The concentration of nanoparticles may be at least about 1250/$mm^3$. The concentration of nanoparticles may be at least about 1300/$mm^3$. The concentration of nanoparticles may be at least about 1350/$mm^3$. The concentration of nanoparticles may be at least about 1400/$mm^3$. The concentration of nanoparticles may be at least about 1450/$mm^3$. The concentration of nanoparticles may be at least about 1500/$mm^3$. The concentration of nanoparticles may be at least about 1550/$mm^3$. The concentration of nanoparticles may be at least about 1600/$mm^3$. The concentration of nanoparticles may be at least about 1650/$mm^3$. The concentration of nanoparticles may be at least about 1700/$mm^3$. The concentration of nanoparticles may be at least about 1750/$mm^3$. The concentration of nanoparticles may be at least about 1800/$mm^3$. The concentration of nanoparticles may be at least about 1850/$mm^3$. The concentration of nanoparticles may be at least about 1900/$mm^3$.

In some embodiments it may be beneficial to utilize undoped optical fibers. For example, in applications that seek to utilize fiber sensors that are capable of sensing long distances, such as distances greater than 15 km, it may be beneficial to utilize an optical fiber that is pure silica as the fiber sensor.

The optical fibers and fiber sensors disclosed herein may be formed by various processes. These processes include, but are not limited to, a chemical vapor deposition process, such as outside vapor deposition (OVD), vapor axial deposition (VAD), modified chemical vapor deposition (MCVD), plasma chemical vapor deposition (PCVD), or combinations thereof.

It will be apparent to those skilled in the art that various modifications and variations can be made without departing from the spirit or scope of the claims.

What is claimed is:

1. A fiber sensor, comprising:
an optical fiber configured for operation at a wavelength from about 800 nm to about 1600 nm, wherein the optical fiber comprises:
a cladding that is defined by a fiber outer diameter; and
a core that is surrounded by the cladding,
wherein the core of the optical fiber has a Rayleigh scattering coefficient, $\alpha_s$, that is tuned to be within a predetermined range of an optimum $\alpha_s$ for a given total length, L, of the optical fiber, wherein the optimum $\alpha_s$ value is given by:

$$\alpha_s = \frac{4.3}{2L},$$

wherein $\alpha_s$ is controlled during manufacture of the optical fiber by controlling a concentration of at least one dopant, the at least one dopant comprising nanoparticles having a diameter of 300 nm or less, the nanoparticles being doped into the core of the optical fiber at a concentration of at least 800/$mm^3$, the nanoparticles comprising $ZrO_2$, and wherein the predetermined range is from about 70% of the optimum $\alpha_s$, to about 130% of the optimum $\alpha_s$.

2. The fiber sensor of claim 1, wherein the at least one dopant further comprises $GeO_2$ at a concentration of at least about 20%.

3. The fiber sensor of claim 1, wherein the at least one dopant further comprises $GeO_2$ at a concentration of at least about 30%.

4. The fiber sensor of claim 1, wherein the at least one dopant further comprises $GeO_2$ at a concentration of at least about 40%.

5. The fiber sensor of claim 1, wherein the nanoparticles are doped into the core of the optical fiber at a concentration of at least 850/$mm^3$.

6. The fiber sensor of claim 5, wherein the diameter of the nanoparticles is 100 nm.

7. The fiber sensor of claim 1, wherein the nanoparticles are doped into the core of the optical fiber at a concentration of at least 1880/$mm^3$.

8. The fiber sensor of claim 7, wherein the diameter of the nanoparticles is 150 nm.

9. The fiber sensor of claim 1, wherein the nanoparticles are doped into the core of the optical fiber at a concentration of at least 1490/$mm^3$.

10. The fiber sensor of claim 9, wherein the diameter of the nanoparticles is 175 nm.

11. The fiber sensor of claim 1, wherein the nanoparticles are doped into the core of the optical fiber at a concentration of at least 1350/$mm^3$.

12. The fiber sensor of claim 11, wherein the diameter of the nanoparticles is 200 nm.

13. The fiber sensor of claim 1, wherein the optical fiber has a graded index profile.

14. The fiber sensor of claim 1, wherein the optical fiber has a step index profile.

15. The fiber sensor of claim 1, wherein the optical fiber has a total attenuation of 0.205 dB/km or less.

* * * * *